Figure 1:
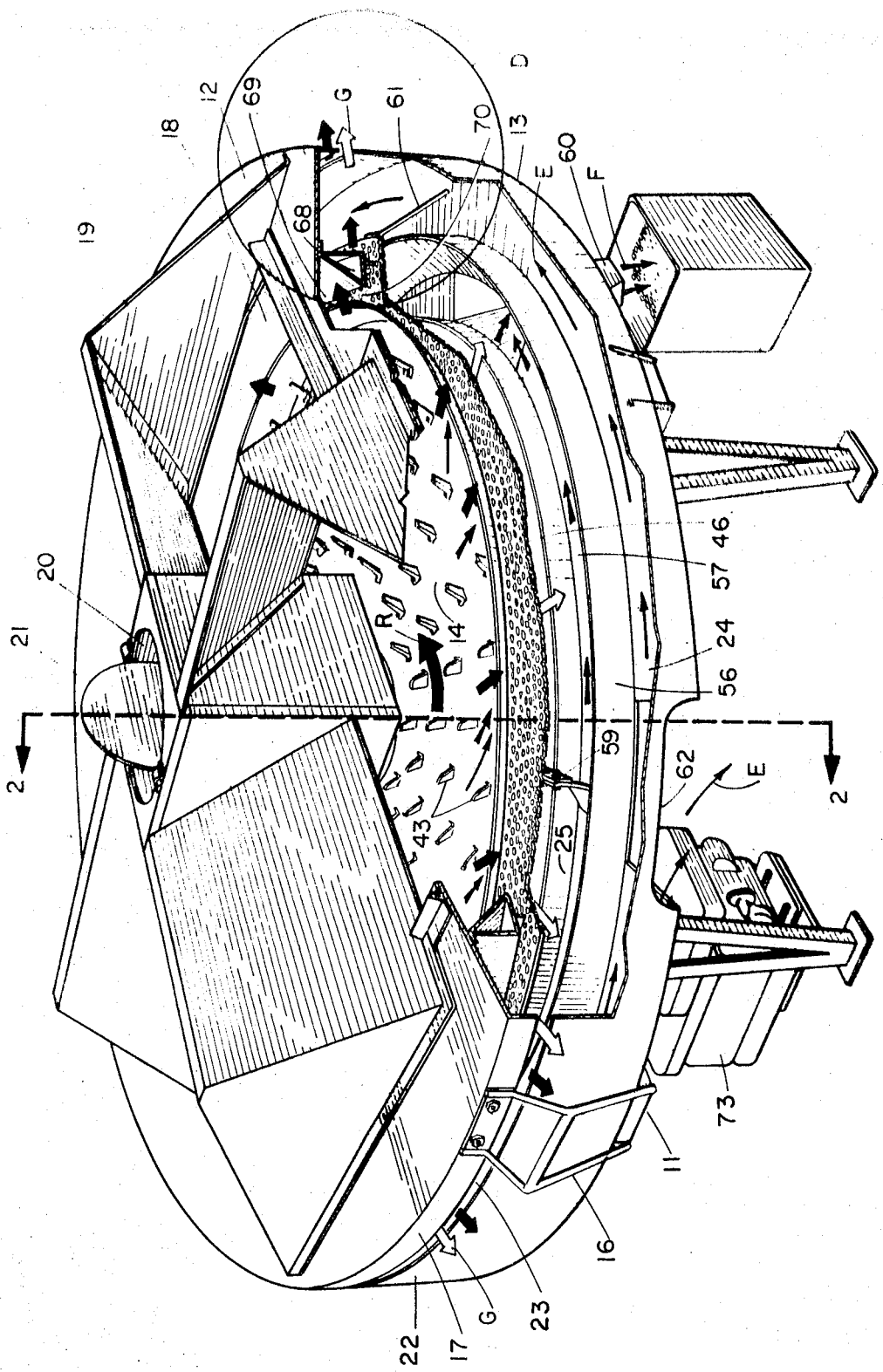

United States Patent [19]
Khan

[11] 3,763,868
[45] Oct. 9, 1973

[54] TABLE THRESHER
[75] Inventor: Amir U. Khan, Okemos, Mich.
[73] Assignee: The United States of America as represented by the Secretary of Agriculture, Washington, D.C.
[22] Filed: July 14, 1971
[21] Appl. No.: 162,571

[30] Foreign Application Priority Data
Jan. 14, 1973 Philippines............................ 11646

[52] U.S. Cl............................................. 130/27 M
[51] Int. Cl. .............................................. A01f 7/02
[58] Field of Search.............. 130/27 M, 30 B, 30 R, 130/7

[56] References Cited
UNITED STATES PATENTS
551,499    12/1895    Landis............................ 130/27 M
1,232,064  7/1917     Maull............................. 130/30 B
1,405,610  2/1922     Maull............................. 130/30 B Primary Examiner—Antonio F. Guida
Attorney—R. Hoffman et al.

[57] ABSTRACT

A threshing machine of the rotary table-type has a horizontally split housing defining an annular opening. Within the housing is a horizontally disposed, rotary threshing table with a plurality of outwardly inclined threshing blades secured on its upper surface, and several radial fan blades on the lower surface. Disposed concentrically with the rotary threshing table, adjacent its periphery, is a rotary annular perforated surface which rotates at a slower rate than the rotary threshing table and over which the threshed materials pass as the latter are thrown off the rotary threshing table. Above the rotary annular perforated surface, and adapted to cooperate therewith, is an annular member, on the bottom side of which are several uniformly spaced apart spiral plates.

6 Claims, 7 Drawing Figures

PATENTED OCT 9 1973 3,763,868
SHEET 3 OF 4
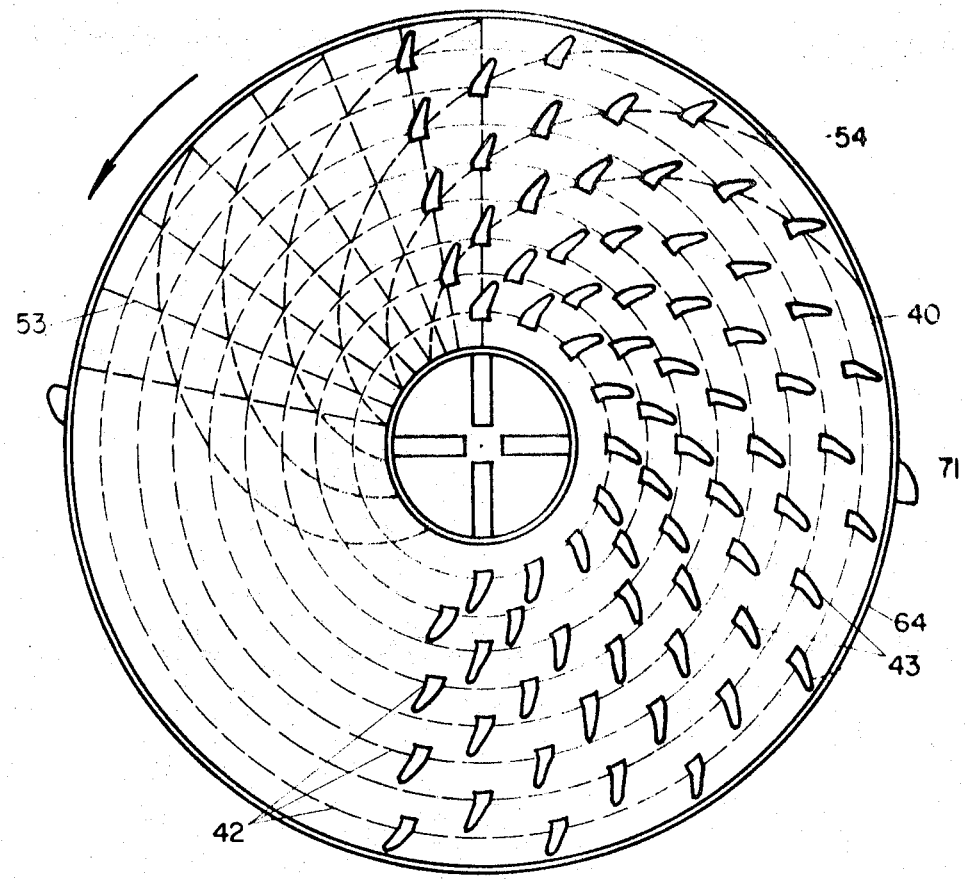
FIG. 3
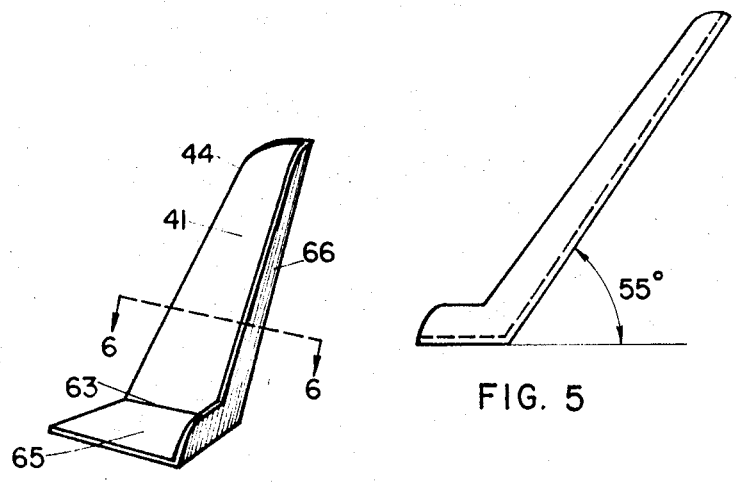
FIG. 4
FIG. 5
FIG. 6

TABLE THRESHER

The invention relates to machines for threshing grains from crops and more particularly relates to a thresher that threshes and then mechanically separates the grains from the straw and removes the lighter-than-grain impurities by pneumatic means under varying crop moisture conditions.

A non-exclusive, irrevocable, royalty-free license in the invention herein described, throughout the world for all purposes of the United States Government, with the power to grant sublicenses for such purposes, is hereby granted to the Government of the United States of America.

Heretofore, agricultural crops have been threshed by machines using cylindrical threshing drums. Threshers of this type are provided with a rotating cylindrical drum with various types of projections on the drum. The popular types employ wire loops, rasp bars, or peg teeth on the cylindrical drum. These threshers are generally equipped with bulky straw walkers to shake the loose grain from the straw. In all cases, grain winnowing means are separately provided in these threshers to cooperate with the cylindrical threshing drum.

The first mentioned threshers have the major disadvantage of poor utilization of the drum threshing surface. All drum threshers, due to drum shape of the threshing cylinder, utilize only a small fraction of the threshing surface at any given time. Consequently threshers with cylindrical drum are heavy and bulky. The straw walkers shake the straw in an up and down motion which requires a long time to dislodge grain resting on top of the straw, thereby resulting in very large size straw walkers. The straw walkers do not turn the straw over and especially of grain, specially when threshing crops with high moisture, is quite poor. The separate winnowing mechanisms on these threshers consists of a centrifugal blower and the fan housing, drive mechanism and shielding add to the bulk of the machine. Often paddy fields have no access roads and conventional threshers are too bulky for moving them into the field. The individually separate mechanisms for threshing, separating and winnowing result in an expensive design and are expensive to operate and maintain.

The thresher of the present invention overcomes the above-mentioned disadvantages. In accordance with this invention, a flat circular member is provided with a threshing surface on its upper side and a radial blower on its underside. This concept has permitted a more effective use of the threshing surface, as well as provided a compact arrangement for grain winnowing, and has resulted in considerable reduction in the thresher weight. The thresher design is simple and can be manufactured at a fairly low cost.

The novel thresher of this invention has a circular threshing table with threshing blades arranged in a self-cleaning pattern on its top surface. The special shape and arrangement of the threshing blades permits free radial movement of straw without clogging the threshing table. A slower rotating, circular screen, concentric with the threshing table, in conjunction with special spiral louvers, separates the grain from the straw with a rolling action. The threshing table has a radial fan built integrally on its underside to blow air through the grain falling from the circular screen for winnowing.

Essentially, the thresher of this invention combines the following features:

a. a flat, circular threshing surface provided over its entirety, or at least over a portion thereof, with a plurality of threshing blades to thresh the grains from the straws;

b. the novel threshing blades are designed to reduce the pulling action of the straws during the threshing operation to reduce entangling of straw on the blade;

c. the blades are mounted at an angle with the threshing surface so as to discharge straws radially outward in a self-shedding manner and thereby prevent the clogging of the threshing surface;

d. the threshing blades are arranged in rows extending spirally outward to the peripheral edge and are inclined opposite to the direction of rotation of the threshing surface to provide a self-cleaning passage for the straw trapped between rows of threshing blades;

e. a cover for the threshing surface which has an air inlet and a plurality of feeding spouts for feeding the paddy plants to be threshed tangentially into the rotating threshing surface and to press the plants against the threshing blades, the feeding spouts being further provided with feeding guards to minimize the scattering of grains and to guide the scattering grains back to the threshing surface;

f. means on the undersurface of the threshing table to blow air radially around the periphery of the threshing surface;

g. a perforated annular rotating surface concentric with the threshing surface to receive the threshed material and to separate the straw from the grain;

h. means to roll the threshed material on top of the perforated annular surface to separate the grain and to transfer the straws and larger-than-grain impurities sideways and outwardly on top of the perforated annular rotating surface; and i. means to blow air under the perforated surface to winnow the grain falling from the perforated annular surface for the removal of dust and other lighter-than-grain impurities from the grain.

Figure 2:
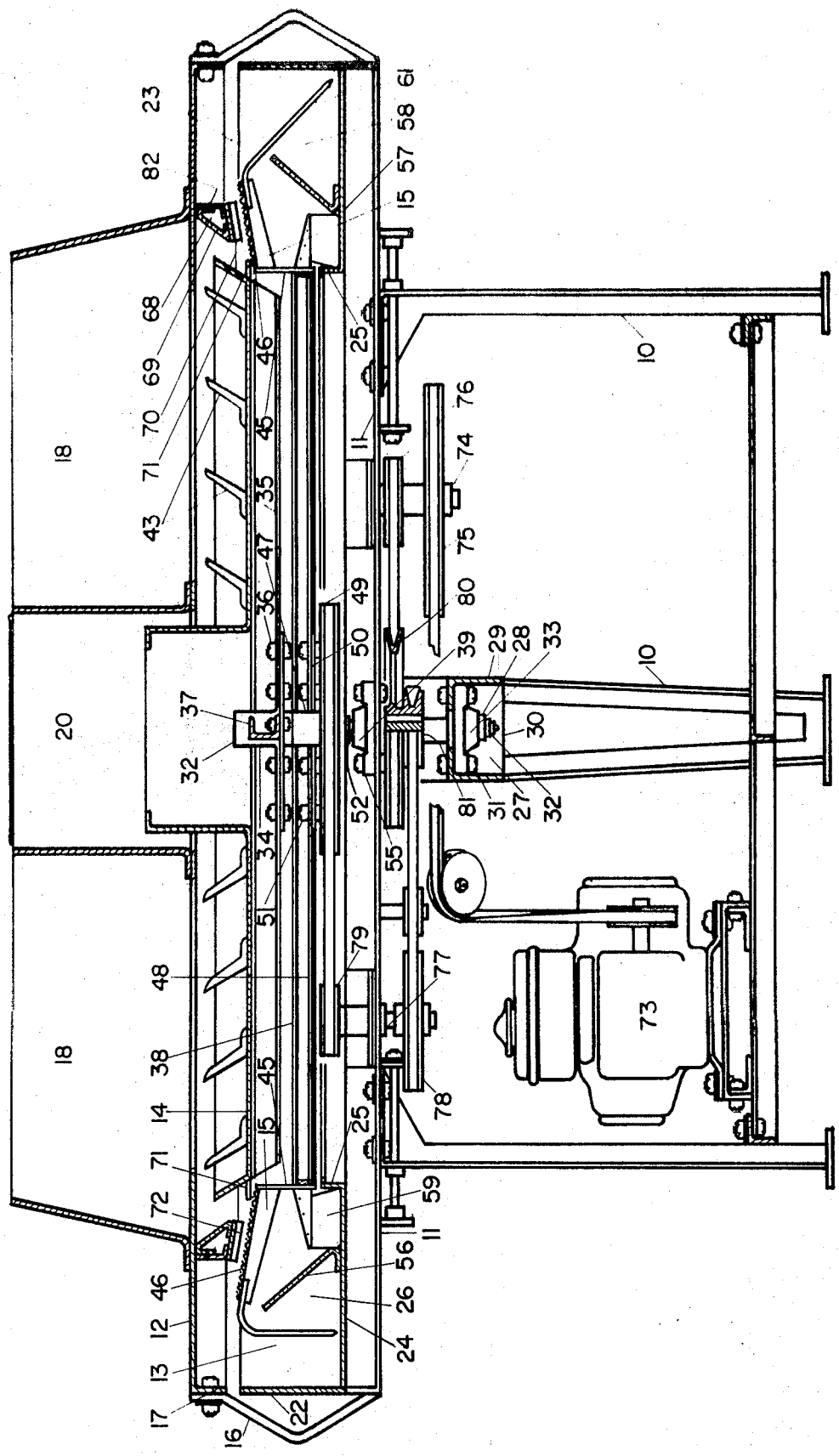

In order that the invention may be more readily understood, reference is now made to the detailed description which follows and to the accompanying drawings in which:

FIG. 1- is a schematic drawing of the TABLE THRESHER with parts cut away to show the internal construction FIG. 2- is a cross sectional view along line 2—2 of FIG. 1

FIG. 3- is a plan view of the threshing surface showing the arrangement of the threshing blades FIG. 4- is a perspective view of one of the threshing blades FIG. 5- is a side elevation of the threshing blades, as viewed in the direction "B" on FIG. 4. seen FIG. 6 is a section taken on line 6—6 of FIG. 4 to show the angle between the leading and trailing edges of the threshing blade.

Figure 7:
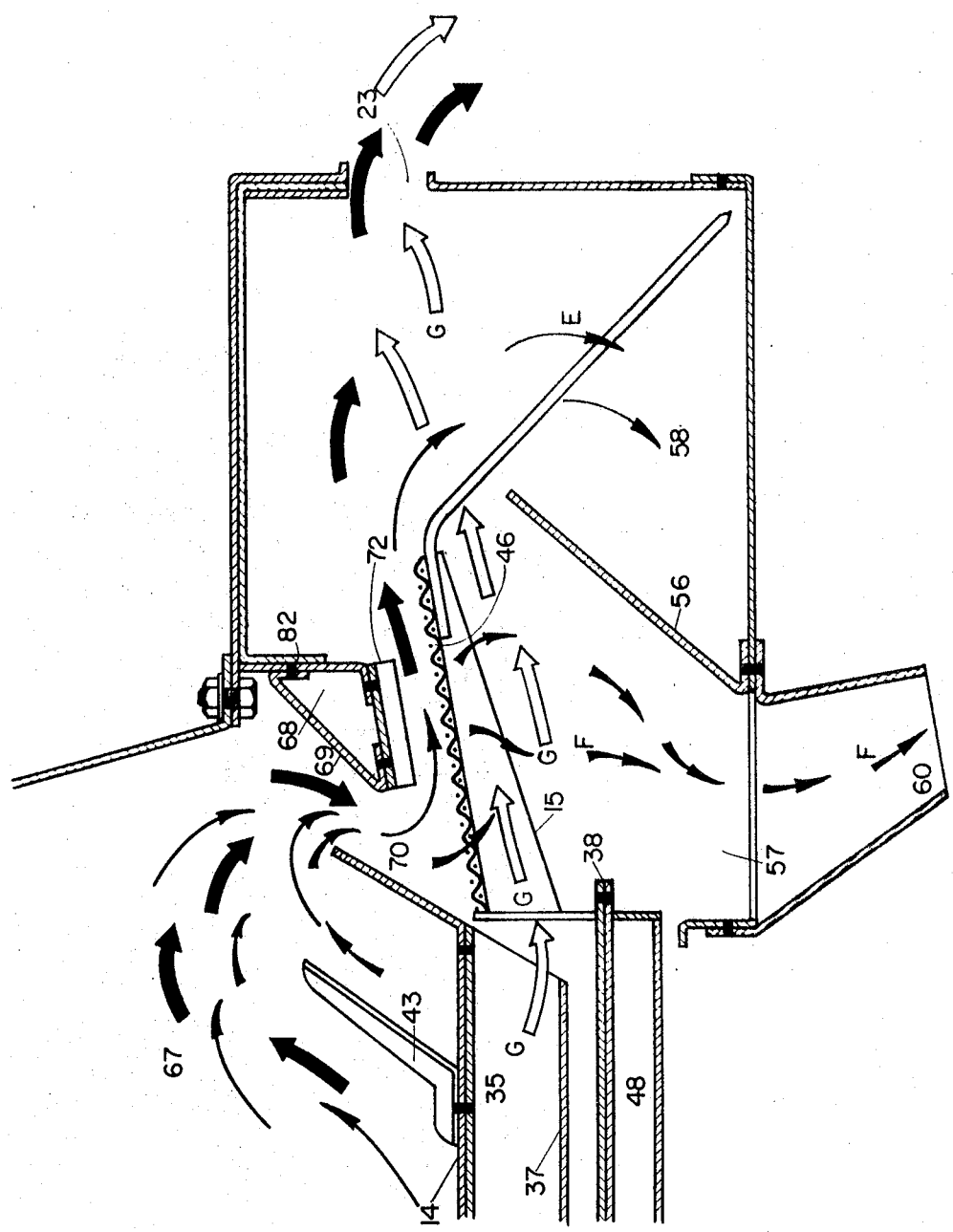

FIG. 7 is an enlarged sectional view of the encircled portion "D" on FIG. 1 to show details of the cleaning means.

In the preferred embodiment of the invention, as shown in FIGS. 1 and 2, the thresher is provided with ground support means 10 for supporting underframe 11 which, in turn, carries housing 13 of the thresher. Although ground support means 10 are shown in FIGS. 1 and 2 as stationary supports, they may, however, be replaced with wheels where it is desired to provide mobility to the thresher. Inside housing 13 are located the horizontal threshing surface 14 and the separating surface 15. As seen from FIG. 1, housing 13 is provided with a generally circular cover 12 having turned down, contiguous sides 17. Cover 12 is carried on underframes 11, to which it is secured by means of a plurality of brackets 16. The horizontal flat surface of cover 12 is provided with a plurality of equally spaced feeding spouts or hoppers 18 through which the material to be threshed is fed to the threshing disc 14.

The feeding spouts 18 are equally spaced over the surface of cover 12. Material to be threshed is fed through guards 19 into spouts 18. Guard 19 may be slidable for easy introduction of the material onto the threshing surface. Although any number of feeding spouts 18 can be provided, it was found by actual threshing experience that the arrangement shown in FIG. 1 greatly reduced the scattering of grain. Spouts 18 may assume any appropriate form, as it will be understood that any opening in the cover capable of admitting material to be threshed into the threshing surface may be utilized.

The cover 12 is provided at its center with a vertical air inlet 20 that extends downwardly to the threshing surface and air control baffle 21.

Referring once more to FIGS. 1 and 2 it will be seen that thresher housing 13 is a continuation of the cover. The downwardly turned side 17 of the cover 12 is of insufficient width to touch the upturned side 22 of the housing thus forming annular chaff discharge outlet 23. Side 22 is integral with the bottom wall 24 of the housing 13 which extends inwardly to upturned wall 25 to form an annular channel 26 which opens to the interior of the thresher cover 12.

Referring now to FIG. 2, one of the supports 10 is shown provided with a brace 27. A similar brace is mounted on the opposite support (not shown). Extending between the supports 10, and secured thereto in any suitable manner familiar to the skilled mechanic, is a pair of angle beams 29, on which is mounted bearing 28. This bearing serves as the lower support for end 33 of rotatable shaft 32. side plates 30 that is preferably attached by bolts to the braces 27 as indicated at 31. Bearing 28 rotatably mounts the main shaft 32 at its lower end indicated at 39.

The topmost portion of the shaft 32 is provided with a hub 34 preferably bolted to said shaft 32. Hub 34 has radial arms 35 welded thereto and said arms support the threshing surface 14. The radial arms 35 have wide flanges 37 which face toward the direction of rotation to serve as fan blades (to be discussed hereinafter). Circular member 64 is secured to flanges 37 by any suitable means, as by bolting.

The threshing surface 14 generally indicated on FIG. 3 comprises a circular member 64 having a plurality of threshing blades 43 over its entire area or at least a portion thereof. According to the invention each blade is formed with plane tongues 41 following upon each other and separated by spaces 42 which are relatively wide. These blades are angularly bent along the base 65 as indicated at 63. The angle included by the tongues 41 and base 65 is preferably about 125° as in the embodiment illustrated in FIG. 4. The blade has a trailing portion 66 and is bent from the tongue 41 at 114°. The trailing portion makes 55° with the threshing surface while the leading portion 44 makes 120° with the threshing surface.

As shown in FIG. 3 the threshing blades are preferably arranged in staggered fashion in a plurality of concentric rows 40 traversing radial rows 53 such that the center of each blade is adjacent to the center of the metal space 42 between the blades of adjacent radial row so as to form a spiral (as indicated at 54) expanding outwardly against the rotation of the threshing surface.

In the operation of threshers heretofore constructed, considerable trouble has been experienced with clogging of the threshing blades and the threshing surface causing a slowing down of and eventual complete stopping of the threshing operation. Considerable difficulty is often experienced in resuming the operation and getting back to normal headway as the result of such clogging stoppages. Such stoppages result in diminishing the working capacity of the thresher. It is for this purpose that the blades 43 are shaped and arranged as stated above.

Because of the shape and arrangement of the threshing blade 43, each blade when moving along the direction of rotation will first allow the threshed material to fall from the preceding blade then into the continuous space 42 and ride over the leading edge 44 of the tongues 41 in the succeeding concentric rows thus moving the straw and grains spirally outwardly (as indicated at 67 on FIG. 7) into the peripheral edge of the threshing surface in a self-cleaning manner.

The threshing surface 14 operates in conjunction with a separating surface 15 comprising metal fins 45 and a perforate annular surface 46. The separating surface is connected to the shaft 32 by means of hub 47 which is provided with a suitable bushing. Metal plate 50 welded on the topmost portion of hub 47, supports a channel member 48 preferably attached to plate 50 by bolts 51. Attached to the channel member (48) preferably by riveting, the metal plate 38 includes at its peripheral edge a plurality of metal fins 45 that supports an upwardly and outwardly inclined perforated screen 46. Hub 47 is further provided with sheave 49 formed integral therewith to provide drive to the separating surface. The hub rests on washer 52 mounted on flange bearing 39 that is attached, preferably by bolts 55 to the underframes 11.

As illustrated in FIG. 2 the threshing surface is supported by radial arms 35 having flanges 37 which provide a wide longitudinal area. Secured and extended radially from the shaft 32, the radial arms 35 are spaced at a predetermined distance relative to each other so that on rotation of the threshing surface, air rushes in from the inlet 20 to fill the expanded space between the radial arms. The stream of air (6) (see FIGS. 1 and 2) discharges into outlet 23 through the separating surface 15 thereby picking up chaff and light impurities from the threshed material falling from the periphery of the threshing surface and through the perforated annular surface 46.

The separating surface 15 as illustrated in FIG. 2 is provided with a material guide 68. This guide is attached to the undersurface of the cover as indicated at 82 and is shaped to form a triangular transverse cross-section. The guide 68 has an inclined side 69 that forms an annular passage 70 with side 64 of threshing member 14. Below guide 68, and having suitable clearance with the perforate annular surface 46 are the ejecting and rolling spirals 72 preferably made of metal sheet, that expands outwardly with respect to the axis of rotation.

As the threshed material is discharged from the threshing surface by centrifugal force, it is immediately arrested by the guide 68. Due to the position of side 69, the threshed material falls into the annular passage 70. A straw agitator rod 71 attached to the threshing surface disperses the threshed material to prevent clogging of the passage 70. This agitation causes the grain to fall into the screen and onto the grain pan 57, whereas the straws, chaff and dirt are acted upon by the blowing action of the radial arms 35. This blowing action in conjunction with the pushing effect of the rod 71 moves the straws and chaffs into the ejecting and rolling spiral 72 wherein it is subjected to a rolling action by the rotation of the separating surface. Grain carried along by the straws is finally removed. Chaff and light impurities are carried by air stream G as it discharges annular outlet 23 while heavy dirt and straws E are discharged into the straw pan 58 as shown clearly in FIGS. 2 and 7. It is seen, therefore, that the threshed grain or seed is separated from the straws by the blowing action of the radial arms 35 and further separated by the mechanical action of the spiral 72 and the perforate annular surface 46.

The annular channel 26 is provided with plate 56 which divides the channel to form a grain pan 57 and straw pan 58 which are provided with respective troughs. Grain sweepers 59 equally spaced along the circumference of the separating surface 15 move the grain F into trough 60 as indicated. The straw sweep rods 61 are equally spaced apart in the peripheral edge of the threshing surface 15 and arranged in such a manner that each rod 61 extends farther out with respect to the axis of rotation than the preceding rod so that the four sweep wire 61 cover the entire surface of the straw pan 58. The straw sweepers move the straws E into a series of transverse slots (not shown) immediately before the straw trough 62 for the purpose of collecting any grains thay may have entered the straw pan 58.

In order to rotate the threshing and separating surfaces an engine 73 is supplied which is supported on a platform provided on the ground support 10. Any suitable form of drive connection from the engine 73 to the main shaft 32 may be utilized and there is diagrammatically shown a belt and pulley assembly for this purpose.

Stub shafts 74 and 77 FIG. 2 are also provided on the underframe 11, these shafts rotatably supporting pulleys 75, 76 and 78, 79 respectively.

The main shaft 32 has pulley 80 and which is belt connected to pulley 76 whereby rotation of the shaft 32 by the engine causes rotation of the threshing surface in the direction of the arrow superimposed on this surface in FIG. 1.

To rotate the separating surface 15 a pulley 49 suitably sleeved with the main shaft 32 is connected to pulley 79 on stub shaft 77. Stub shaft 77 is rotated by the main shaft 32 through pulley 81. As illustrated, the separating surface rotates at a much slower speed than the threshing surface.

It is to be understood that the form of the invention herewith shown and described is to be taken as a preferred embodiment thereof and that various changes in the form, construction and arrangement of the parts may be resorted to without departing from the spirit of the invention or the scope of the subjoined claims.

I claim:
1. A table-type threshing machine comprising
   a. a housing comprising an upper cover portion having circumscribing downturned sides and a plurality of off-center openings for feeding material to be threshed, and a lower portion having circumscribing upturned sides spaced below said upper cover portion, said downturned and upturned sides being of such width that, when said housing portions are assembled in the threshing machine, said sides define between them an annular peripheral opening;
   b. a flat, rotatable, horizontally circular threshing member within said housing, said threshing member having a central opening;
   c. a plurality of threshing blades rigidly secured to the upper surface of said threshing member and a plurality of radial fan blades rigidly secured to the lower surface of said threshing member;
   d. rotatable, concentric annular separating means adjacent the periphery of said threshing member, said separating means including a perforate annular surface;
   e. annular stationary means secured to the upper cover portion of the housing extending downwardly to terminate in close proximity to the perforate surface of the rotatable annular separating means, said stationary means and rotatable, annular separating means cooperating to roll and move threshed material on top of said rotatable, annular separating means as said means rotates;
   f. a pair of totatable, vertical shafts, one of said shafts having the circular threshing member fixedly mounted thereon, the other of said shafts having the annular separating means fixedly mounted thereon; and
   g. means for independently rotating said shafts at variable speeds.

2. A threshing machine as in claim 1 having a plurality of threshing blades mounted on said threshing surface; each of said blades comprising a plate having a receding leading portion and a trailing portion; and said blades being inclined obtusely outwardly along a radial direction with each trailing portions of each blade being positioned substantially oblique from said radial direction.

3. A threshing machine as in claim 2 wherein the threshing blades are arranged in rows extending substantially spirally and outwardly to the peripheral edge opposite to the direction of rotation of said threshing surface to provide substantially self-cleaning action.

4. A threshing machine as in claim 3 wherein the means to roll and move the threshed material comprises of a plurality of plates attached on the undersurface of a material guide; said plates extending substantially spirally outwardly with respect to the axis of rotation; said plates and said guide being adapted to maintain a pre-determined clearance with the perforate annular surface of said separating surface.

5. A threshing machine as in claim 1 wherein the lower portion of said housing includes a fixed annular trough disposed generally below said annular separating surface, said annular trough being divided by an annular wall into an inner annular grain trough and an outer straw trough portion, said inner and outer trough portions having independent discharge openings.

6. A threshing machine as in claim 5 wherein said annular separating surface includes a plurality of uniformly angularly spaced grain sweepers extending into said inner annular grain trough, and a plurality of uniformly angularly spaced straw sweep rods extending into said outer straw trough.

* * * * *